United States Patent [19]
Zaumen et al.

[11] Patent Number: 6,118,760
[45] Date of Patent: Sep. 12, 2000

[54] MANAGEMENT OF ENTRIES IN A NETWORK ELEMENT FORWARDING MEMORY

[75] Inventors: William T. Zaumen, Palo Alto, Calif.; Donald L. Hoffman, Portland, Oreg.; Shree Murthy, Sunnyvale, Calif.

[73] Assignee: Sun Microsystems, Inc., Mountain View, Calif.

[21] Appl. No.: 08/884,946

[22] Filed: Jun. 30, 1997

[51] Int. Cl.[7] .................................................. H04Q 11/04
[52] U.S. Cl. ......................... 370/229; 370/254; 370/389; 370/428; 370/475
[58] Field of Search .................................. 370/229, 330, 370/381, 386, 428, 469, 475, 237, 254, 389, 396, 397, 401, 402, 468; 365/49; 395/180, 182.03

[56] References Cited

U.S. PATENT DOCUMENTS

| | | | |
|---|---|---|---|
| 4,652,874 | 3/1987 | Loyer | 340/825.05 |
| 4,850,042 | 7/1989 | Petronio et al. | 455/606 |
| 4,922,503 | 5/1990 | Leone | 370/85.13 |
| 4,933,938 | 6/1990 | Sheehy | 370/85.13 |
| 5,150,358 | 9/1992 | Punj et al. | 370/468 |
| 5,210,746 | 5/1993 | Maher et al. | 370/386 |
| 5,220,562 | 6/1993 | Takada et al. | 370/401 |
| 5,251,205 | 10/1993 | Callon et al. | 370/60 |
| 5,293,379 | 3/1994 | Carr | 370/474 |
| 5,309,437 | 5/1994 | Perlman et al. | 340/827 |
| 5,343,471 | 8/1994 | Cassagnol | 370/85.13 |
| 5,386,413 | 1/1995 | McAuley et al. | 370/54 |
| 5,392,432 | 2/1995 | Engelstad et al. | 395/180 |
| 5,394,402 | 2/1995 | Ross | 370/94.1 |
| 5,410,540 | 4/1995 | Aiki et al. | 370/390 |
| 5,422,838 | 6/1995 | Lin | 365/49 |
| 5,425,028 | 6/1995 | Britton et al. | 370/94.1 |
| 5,459,714 | 10/1995 | Lo et al. | 370/13.1 |
| 5,459,717 | 10/1995 | Mullan et al. | 370/351 |
| 5,461,624 | 10/1995 | Mazzola | 370/402 |
| 5,485,455 | 1/1996 | Dobbins et al. | 370/255 |
| 5,485,578 | 1/1996 | Sweazey | 395/200.54 |
| 5,490,139 | 2/1996 | Baker et al. | 370/60 |
| 5,490,252 | 2/1996 | Macera et al. | 395/200.01 |
| 5,500,860 | 3/1996 | Perlman et al. | 370/85.13 |
| 5,561,666 | 10/1996 | Christensen et al. | 370/434 |
| 5,572,522 | 11/1996 | Calamvokis et al. | 370/395 |
| 5,594,727 | 1/1997 | Kolbenson et al. | 370/468 |
| 5,633,865 | 5/1997 | Short | 370/412 |
| 5,636,371 | 6/1997 | Yu | 395/500 |
| 5,640,605 | 6/1997 | Johnson et al. | 395/881 |
| 5,651,002 | 7/1997 | Van Seters et al. | 370/392 |
| 5,675,741 | 10/1997 | Aggarwal et al. | 370/200.12 |

(List continued on next page.)

OTHER PUBLICATIONS

"Foundry Products", downloaded from Website http://www.foundrynet.com/ on Jun. 19, 1997.
Anthony J. McAuley & Paul Francis, "Fast Routing Table Lookup Using CAMs", IEEE, 1993, pp. 1382–1390.
"Gigabit Ethernet", Network Strategy Report, The Burton Group, v2, May 8, 1997 40 pages.
"IP On Speed", Erica Roberts, Internet–Draft, Data Communications on the Web, Mar. 1997, 12 pages.
"Multilayer Topology", White Paper, Internet–Draft, 13 pages, downloaded from website http://wwwbaynetworks.com on Apr. 18, 1997.

*Primary Examiner*—Douglas W. Olms
*Assistant Examiner*—Shick Hom
*Attorney, Agent, or Firm*—Blakely Sokoloff Taylor & Zafman

[57] ABSTRACT

The invention generally provides for a network element and methods in the network element for allowing a matching entry in a forwarding memory to be found in a single search of the memory, for determining when an entry should be placed in the memory, and for determining when an entry should be removed from the memory, in order to make more efficient use of the fixed space available in the memory. The invention is particularly useful in making more efficient use of a Content Addressable Memory (CAM) for storing flow entries, and configuring the CAM to index an associated memory that stores forwarding and quality of service information for each CAM entry.

36 Claims, 3 Drawing Sheets

U.S. PATENT DOCUMENTS

| | | | |
|---|---|---|---|
| 5,724,358 | 3/1998 | Headrick et al. | 370/418 |
| 5,734,865 | 3/1998 | Yu | 395/500 |
| 5,740,171 | 4/1998 | Mazzola et al. | 370/392 |
| 5,740,175 | 4/1998 | Wakeman et al. | 395/422 |
| 5,740,375 | 4/1998 | Dunne et al. | 395/200.68 |
| 5,742,604 | 4/1998 | Edsall et al. | 370/401 |
| 5,742,760 | 4/1998 | Picazo, Jr. et al. | 370/351 |
| 5,745,048 | 4/1998 | Taguchi et al. | 370/330 |
| 5,748,905 | 5/1998 | Hauser et al. | 395/200.79 |
| 5,751,967 | 5/1998 | Raab et al. | 395/200.58 |
| 5,754,540 | 5/1998 | Liu et al. | 370/315 |
| 5,764,634 | 6/1998 | Christensen et al. | 370/401 |
| 5,784,573 | 7/1998 | Szczepanek et al. | 395/200.8 |
| 5,790,546 | 8/1998 | Dobbins et al. | 370/400 |
| 5,802,052 | 9/1998 | Venkataraman | 370/395 |

MANAGEMENT OF ENTRIES IN A NETWORK ELEMENT FORWARDING MEMORY

BACKGROUND

1. Field of the Invention

The invention is generally related to network elements for communication between computers, and more specifically related to the creation and elimination of entries in a forwarding memory.

2. Description of Related Art

Communication between computers has become an important aspect of everyday life in both private and business environments. Computers converse with each other based upon a physical medium for transmitting the messages back and forth, and upon a set of rules implemented by electronic hardware attached to and programs running on the computers. These rules, often called protocols, define the orderly transmission and receipt of messages in a network of connected computers.

A local area network (LAN) is the most basic and simplest network that allows communication between a source computer and destination computer. The LAN can be envisioned as a cloud to which computers (also called endstations or end-nodes) that wish to communicate with one another are attached. At least one network element will connect with all of the endstations in the LAN. An example of a simple network element is the repeater which is a physical layer relay that forwards bits. The repeater may have a number of ports, each endstation being attached to one port. The repeater receives bits that may form a packet of data that contains a message from a source endstation, and blindly forwards the packet bit-by-bit. The bits are then received by all other endstations in the LAN, including the destination.

A single LAN, however, may be insufficient to meet the requirements of an organization that has many endstations, because of the limited number of physical connections available to and the limited message handling capability of a single repeater. Thus, because of these physical limitations, the repeater-based approach can support only a limited number of endstations over a limited geographical area.

The capability of computer networks, however, has been extended by connecting different subnetworks to form larger networks that contain thousands of endstations communicating with each other. These LANs can in turn be connected to each other to create even larger enterprise networks, including wide area network (WAN) links.

To facilitate communication between subnets in a larger network, more complex electronic hardware and software have been proposed and are currently used in conventional networks. Also, new sets of rules for reliable and orderly communication among those endstations have been defined by various standards based on the principle that the endstations interconnected by suitable network elements define a network hierarchy, where endstations within the same subnetwork have a common classification. A network is thus said to have a topology which defines the features and hierarchical position of nodes and endstations within the network.

The interconnection of endstations through packet switched networks has traditionally followed a peer-to-peer layered architectural abstraction. In such a model, a given layer in a source computer communicates with the same layer of a peer endstation (usually the destination) across the network. By attaching a header to the data unit received from a higher layer, a layer provides services to enable the operation of the layer above it. A received packet will typically have several headers that were added to the original payload by the different layers operating at the source.

There are several layer partitioning schemes in the prior art, such as the Arpanet and the Open Systems Interconnect (OSI) models. The seven layer OSI model used here to describe the invention is a convenient model for mapping the functionality and detailed implementations of other models. Aspects of the Arpanet, however, (now redefined by the Internet Engineering Task Force, or IETF) will also be used in specific implementations of the invention to be discussed below.

The relevant layers for background purposes here are Layer 1 (physical), Layer 2 (data link), and Layer 3 (network), and to a limited extent Layer 4 (transport). A brief summary of the functions associated with these layers follows.

The physical layer transmits unstructured bits of information across a communication link. The repeater is an example of a network element that operates in this layer. The physical layer concerns itself with such issues as the size and shape of connectors, conversion of bits to electrical signals, and bit-level synchronization.

Layer 2 provides for transmission of frames of data and error detection. More importantly, the data link layer as referred to in this invention is typically designed to "bridge," or carry a packet of information across a single hop, i.e., a hop being the journey taken by a packet in going from one node to another. By spending only minimal time processing a received packet before sending the packet to its next destination, the data link layer can forward a packet much faster than the layers above it, which are discussed next. The data link layer provides addressing that may be used to identify a source and a destination between any computers interconnected at or below the data link layer. Examples of Layer 2 bridging protocols include those defined in IEEE 802 such as CSMA/CD, token bus, and token ring (including Fiber Distributed Data Interface, or FDDI).

Similar to Layer 2, Layer 3 also includes the ability to provide addresses of computers that communicate with each other. The network layer, however, also works with topological information about the network hierarchy. The network layer may also be configured to "route" a packet from the source to a destination using the shortest path. Finally, the network layer can control congestion by simply dropping selected packets, which the source might recognize as a request to reduce the packet rate.

Finally, Layer 4, the transport layer, provides an application program such as an electronic mail program with a "port address" which the application can use to interface with Layer 3. A key difference between the transport layer and the lower layers is that a program on the source computer carries a conversation with a similar program on the destination computer, whereas in the lower layers, the protocols are between each computer and its immediate neighbors in the network, where the ultimate source and destination endstations may be separated by a number of intermediate nodes. Examples of Layer 4 and Layer 3 protocols include the Internet suite of protocols such as TCP (Transmission Control Protocol) and IP (Internet Protocol).

Endstations are the source and ultimate destination of a packet, whereas a node refers to an intermediate point between the endstations. A node will typically include a network element which has the capability to receive and forward messages on a packet-by-packet basis.

Generally speaking, the larger and more complex networks typically rely on nodes that have higher layer (Layers 3 and 4) functionalities. A very large network consisting of several smaller subnetworks must typically use a Layer 3 network element known as a router which has knowledge of the topology of the subnetworks.

A router can form and store a topological map of the network around it based upon exchanging information with its neighbors. If a LAN is designed with Layer 3 addressing capability, then routers can be used to forward packets between LANs by taking advantage of the hierarchical routing information available from the endstations. Once a table of endstation addresses and routes has been compiled by the router, packets received by the router can be forwarded after comparing the packet's Layer 3 destination address to an existing and matching entry in the memory.

As packets are being transmitted and received between endstations, they must traverse intermediate nodes in which a network element receives a packet and forwards it towards its final destination. When a packet arrives at such an element, the packet's headers (or portions of the headers) are collected and an attempt is then made to match using hardwired logic the destination of the packet to a known Layer 2 destination address in an address table stored in a forwarding memory. Alternatively, a matching cycle may be performed in software based on the Layer 3 information contained in the received packet's header.

As a high performance device, the forwarding memory must be able to produce the matching entry from among thousands of entries in a relatively short time. This speed is important because the decision to forward the received packet to its destination must be made as soon as possible after receiving the packet to make room for other arriving packets.

Existing techniques for implementing the forwarding memory include the use of a content addressable memory (CAM) to store a Layer 2 address table. The CAM is typically implemented as a hardwired logic integrated circuit and is nicely suited for the job of storing an address table in a network element. The high performance offered by a CAM, however, comes at a high cost because of its unique and complex hardware requirements. Therefore, a CAM for use as a forwarding memory in networking applications is typically selected to provide space for only a limited number of entries.

One way to make efficient use of the forwarding memory is to reduce the number of entries by discarding stale entries after a given time has elapsed, the rationale being that since there has not been much activity in the past, there will not be much in the future. The price paid for using this approach is that if a subsequent matching packet does arrive fairly quickly after the entry is discarded, then a new identical entry must be created. This will interfere with both header processing and forwarding memory operations. It would be desirable, therefore, to devise a technique for even more efficient use of the forwarding memory in a networking application. What is needed is a network element that makes efficient use of the forwarding memory in order to forward packets faster and save costly storage space in the forwarding memory.

SUMMARY

The invention generally provides for a network element and methods in the network element for allowing a matching entry in a forwarding memory to be found in a single search of the memory, for determining when an entry should be placed in the memory, and for determining when an entry should be removed from the memory, in order to make more efficient use of the fixed space available in the memory. The invention is particularly useful in making more efficient use of a Content Addressable Memory (CAM) for storing flow entries, and configuring the CAM to index an associated memory that stores forwarding and quality of service information for each CAM entry.

A flow is defined by the network element as a series of related packets that may be represented by a single entry containing Layer 3 and higher layer information in the forwarding memory. The network element is configured to identify such packets as members of a flow. The network element selects certain fields in the entry to include wildcards. Wildcarding the entry may result in multiple flows matching the entry, which can then handle a greater number of received packets, thereby reducing the number of entries in the forwarding memory in return for coarser granularity in routing and quality of service control.

To ensure a deterministic matching result following a single search of the forwarding memory having wildcarded entries, the network element is configured to produce only the most specific match where multiple matches exist in the forwarding memory. In one embodiment, the network element is configured to order the entries in the forwarding memory most specific, so that the first matching entry will always be the most specific entry among multiple matching entries. Alternatively, the most specific match can be determined by dedicated hardware coupled to the forwarding memory.

Regardless of whether wildcards are used, entries are aged using dual time-out periods in another embodiment of the invention. When an entry is placed in the forwarding memory, a first timer is set to a first time. If no matching packets arrive before the first time elapses, the entry is marked for removal. If a matching packet does arrive before the first time elapses, then a second timer is set to a second time that is different than the first time. Subsequently, the entry is removed if either no matching packet arrives by the time the second time elapses, or a matching packet arrives late (after the second time has elapsed). Additional timers such as a third, fourth, . . . could be used which would be equivalent to changing the second timer dynamically. In the preferred embodiment of the invention, the second time is longer than the first time.

BRIEF DESCRIPTION OF THE DRAWINGS

The above aspects and features of the invention will be better understood by referring to the drawings, detailed description, and claims below, where:

DETAILED DESCRIPTION

Although as generally summarized above, the invention may be applied to manage any type of forwarding entry in a network element, the invention is particularly useful for managing end-to-end flows. A flow is a sequence of packets arriving at and identified by the network element as a single Layer 3 entry in the forwarding memory. The packets are related in that they originate from the same end-node and normally have the same destination end-node based on their Layer 3 (network layer) and Layer 4 (transport layer) headers as defined by the Open System Interconnect (OSI) Reference Model. The packets in a flow normally receive the same quality of service (QOS) by the network element.

Membership in a flow can be based in part upon the transport layer (Layer 4) protocol used such as Transmission Control Protocol (TCP) or User Datagram Protocol (UDP), the network layer (Layer 3) addresses such as Internet Protocol (IP) addresses, and the application source and destination UDP or TCP ports (part of the transport layer protocol). Similar definitions for other protocols can be developed by those skilled in the art.

Figure 1:
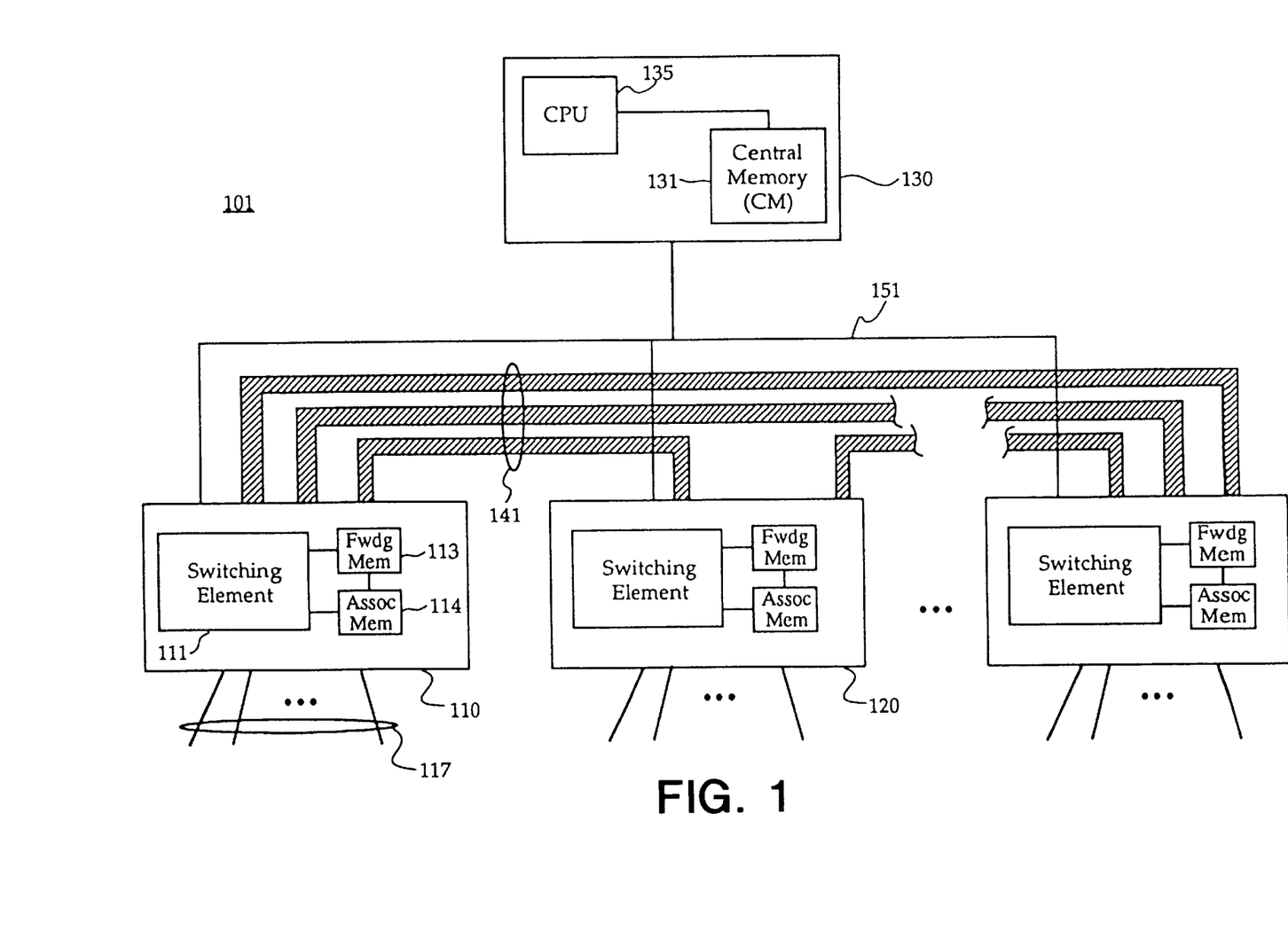
FIG. 1 is a block diagram of a network element for implementing the invention.

FIG. 1 illustrates an exemplary setting for practicing the invention in a network element 101. The network element is configured to relay packets and contains a number of subsystems 110 that are interconnected by internal links 141. A central processing system (CPS) having a programmed central processing unit (CPU) 135 and a central memory 130 couples with the different subsystems 110 through a conventional computer communication bus, such as a Peripheral Components Interconnect (PCI) bus. Each subsystem 110 has a hardware search engine that includes a hardwired logic switching element 111 coupled to a forwarding memory 113 and associated memory 114. The address table used for forwarding packets through the network element is stored in the forwarding memory 113, while the forwarding and quality of service (QOS) information associated with each entry is stored in the associated memory 114. In a preferred embodiment, the forwarding memory is implemented by a CAM while the associated memory includes a random access memory (RAM). Alternatively, the associated data normally stored in the separate RAM can be stored in the CAM together with the address table. In yet another embodiment, the forwarding memory may be implemented by a programmed processor or hardwired logic circuit that implements a hash table.

The network element 101 forwards packets received by an external connection 117 to one or more other external connections based on the packets' headers and programmed criteria in the CPS and the individual subsystems 110. For example, a newly arrived packet at the subsystem 110 will be processed by a hardware class filter in the switching element 111 which identifies the packet as a member of one of several predefined packet types. The packet's headers are then evaluated against the entries in the forwarding memory 113 that are of the identified class. A matching entry will have one or more subsystem ports identified in the associated memory 114 as well as a certain QOS. The packet will then be forwarded, based on the associated data, out of the inbound subsystem 110 or to another subsystem 120, as identified in the associated memory. In the event of a "miss" (no matching entry), the CPS 130 may be configured to handle the forwarding aspects based on its software routines.

Throughout this disclosure, references are made to the CPS 130 performing certain actions or causing certain other actions to be performed. These refer, in general, to actions and decisions by the programmed CPU 135. However, one skilled in the art will recognize that other means for implementing those actions or decisions can be used, including hardwired logic circuits, in order to obtain certain advantages such as speed of execution.

Figure 2:
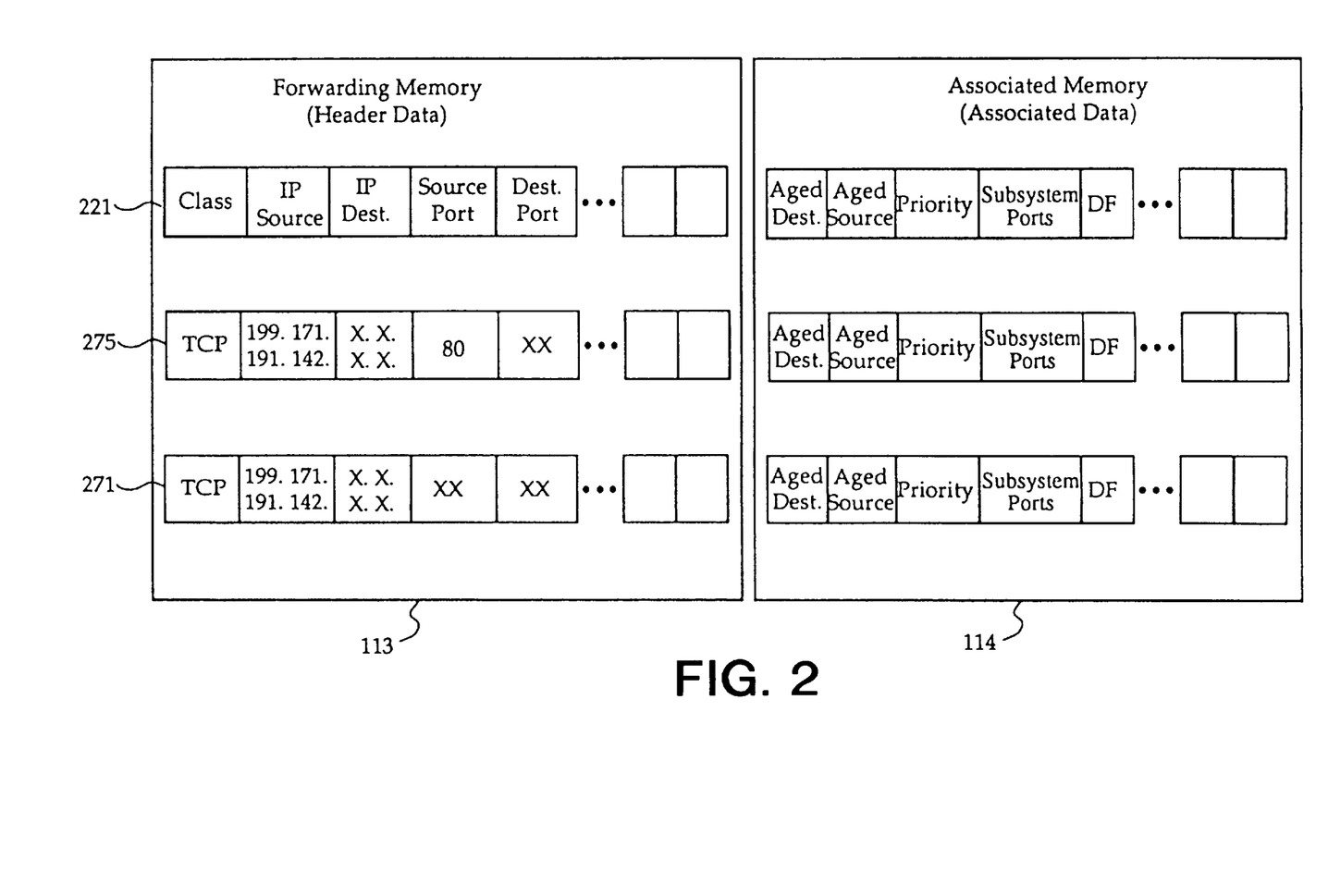
FIG. 2 illustrates a forwarding memory and associated memory configured according to another embodiment of the invention.

The CPS 130 is configured to evaluate, based on previously programmed criteria, whether or not a flow entry 221 should be added to the forwarding memory 113 in response to a subsystem receiving a new packet having unmatching Layer 3 headers. As shown in FIG. 2, the header data for a flow entry according to one embodiment of the invention include but are not limited to the following fields: class, IP source address, IP destination address, application source port, and application destination port. The flow entry 221 can alternatively be configured to store header data for message traffic that is handled in accordance with network layer, transport layer, and higher layer protocols other than TCP/IP. Thus, similar definitions for other protocols can be developed by those skilled in the art.

Regardless of the particular protocols used for each entry in the forwarding memory, the associated memory identifies internal and/or external ports of the inbound subsystem, queuing, priority, header replacement information for routing, age, and distributed flow indication.

In the first embodiment of the invention, when the CPS 130 has determined that a flow entry should be created, wildcards are used so that some of the fields in the entry will contain "don't care" bits that will match all combinations. Exemplary entries 271 and 275 which contain certain wildcarded fields are shown in FIG. 2. For example, by removing dependency upon the application source and destination ports, all packets transferred between the same source and destination IP addresses using TCP will match the entry 271 and will be forwarded based on the same associated data.

As another example, a flow can be defined as having wildcards in both the source and destination port fields as well as the IP destination, with the IP source identified as the address of a particular site on the Internet. Thereafter, all traffic from that site will match the flow entry and will normally receive the same priority and quality of service.

Using wild cards in the header data of an entry for defining flow membership will reduce the total number of entries in the address table as the flow is broadly defined, thus resulting in more frequent matches. This comes at the expense of coarser granularity for the network element 101's ability to control QOS. For finer granularity (more specific control over packet forwarding) more specific entries can be added to the forwarding memory in order to more specifically define priority and QOS for certain packets. However, doing so may result in multiple matching entries where wildcarding is used. For example, referring to the exemplary forwarding and associated memories in FIG. 2, entry 271 will match all traffic from the specified IP source. If entry 275 is added by the network element to specifically control QOS for packets originating from application port 80, then a subsequent packet originating with port 80 on the endstation assigned to the source IP address specified will yield two matching entries 271 and 275. As the network element is preferably configured to forward packets based on deterministic criteria, multiple matching entries presents a problem that needs to be dealt with in a predictive manner.

An important aspect of the invention, therefore, lies in solving the multiple matching entry problem by ordering the entries from a least specific to a most specific fashion in the forwarding memory 113. The ordering is normally set by requiring that the number of wildcard bits be lower in earlier entries, by placing entries that support resource-reservation protocols such as RSVP before those having default values, and by ordering entries to support administrative criteria. However, ordering may be different in order to satisfy certain administrative criteria.

The three TCP class entries shown in the forwarding memory 113 of FIG. 2 are given as an example of the ordering scheme. Entry 271 is less specific than entry 275 because the former includes wildcards in the application source port field whereas the latter does not. In general, by ordering the entries such that an entry has more wildcarded bits in a given field than the one above it, and by defining the first match to be the one to use for forwarding the packet, a single sequential search of the forwarding memory 113 from top to bottom will be sufficient to produce a single and normally most specific entry among multiple matching entries. This may also be referred to as the longest matching entry, or the one having the fewest wildcards.

Alternatively, the multiple match situation can be handled by providing additional hardware that is configured specially to detect and select the most specific match as the single output, given a number of matching entries.

Thus, as a first embodiment of the invention, the above discussion of the forwarding memory 113 describes a technique for managing the entries in a forwarding memory so as to provide for faster forwarding of packets using only a single search so that the most specific is matched first, or by selecting the most specific from a number of matching entries. Also, an example was given for detecting and defining Layer 3 flows based on different granularity levels through the use of wildcarding.

Figure 3:
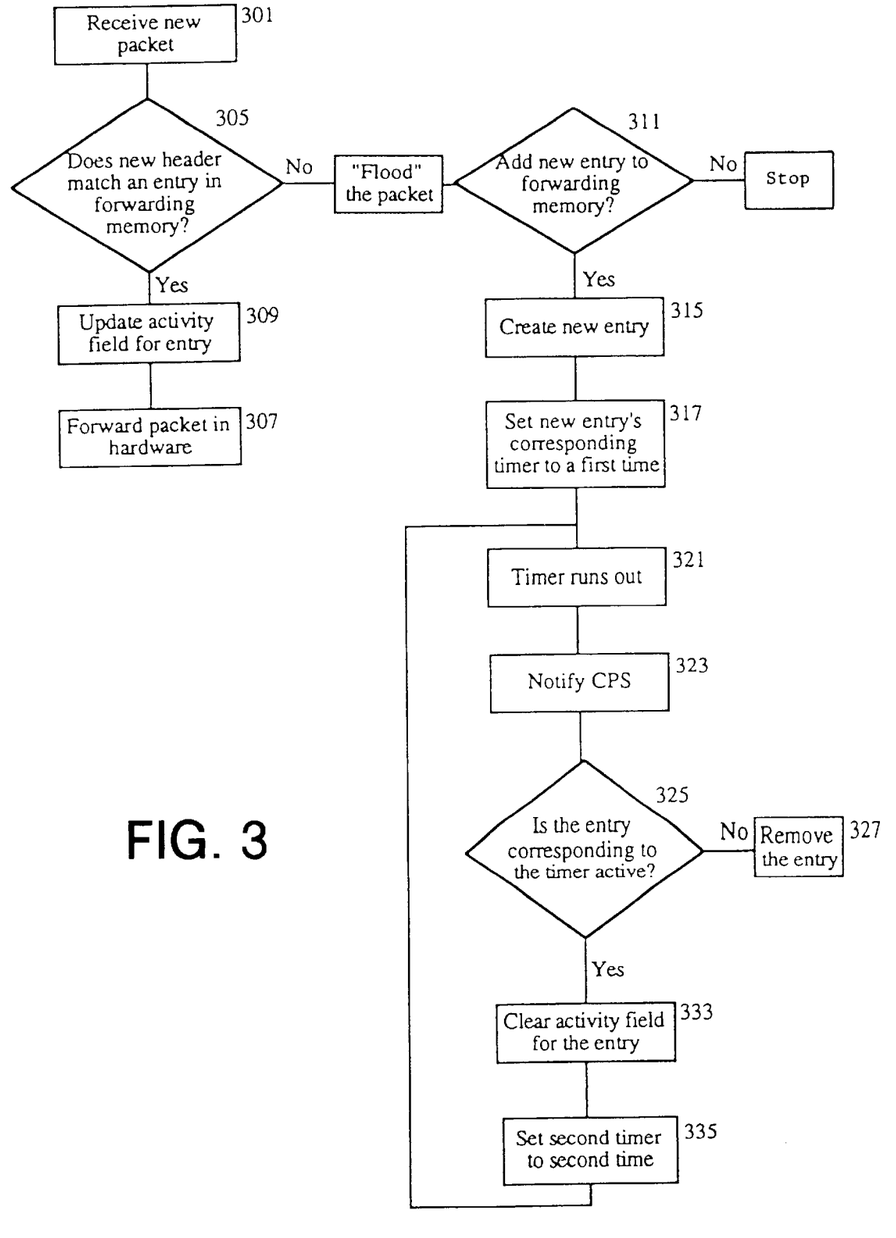
FIG. 3 shows a flow diagram of steps to practice an embodiment of the invention.

A second embodiment of the invention is now discussed which focuses on how to remove Layer 3 flows to use the forwarding memory more efficiently. The embodiment is illustrated in FIG. 3 as an exemplary series of steps to be performed in a network element having a forwarding memory 113 as in FIG. 1. The steps are described while referring to the architecture of FIGS. 1 and 2, and the flow diagram of FIG. 3.

When a new packet is received by the network element 101 in block 301, its header is passed to header matching logic (not shown) in switching element 111. The header matching logic then initiates a matching cycle on the forwarding memory 113 to determine if the new headers match an existing forwarding entry, as in decision block 305.

In decision block 305, the test is whether the new headers match an entry in the forwarding memory 113. If yes, then the packet is forwarded to its destination outside the network element 101 as between subsystems 110 (or within the inbound subsystem 110) using forwarding and quality of service information in the associated memory. The forwarding memory 113 will generate a pointer to an associated location in the associated memory that contains associated data for the matching entry. The associated data will include an external or internal subsystem port, any routing information (if the matching entry is of a hardware route type as indicated in the entry's class field), and priority information for queuing the packet in an external port. Also, whenever a match occurs with an existing entry in the forwarding memory 113, the activity field or aged destination bits are updated to reflect the match, as in block 309.

Returning to decision block 305, if the received packet has unknown headers, i.e., not matching any entries in the forwarding memory 113, then the packet is "flooded" on all internal and external ports of the inbound subsystem. In that case, block 311 calls for a decision as to whether or not add a new entry to the forwarding memory. The decision block 311 is preferably performed by CPS 130 in response to receiving relevant portions of the headers of the new packet from the inbound subsystem. For packets that fall within the flow class, such that a Layer 3 flow entry may need to be created, the header portions sent to the CPS include the IP source and destination addresses, and the application source and destination ports (Layers 3 and 4). If the class filter in the subsystem 110 indicates that a hardware route is supported by the network element 101 for the received packet, then the Layer 2 source and destination addresses are also sent to the CPS. The CPS 130 then determines, based on previously programmed information in the CPS about the header fields, whether or not an entry should be added to the forwarding memory.

If the CPS 130 determines that an entry should be added to the forwarding memory as in block 311, then the CPS 130 causes the entry to be created in the forwarding memory 113 as in block 315. The CPS 130 can place don't care bits in any field of the entry for the desired level of granularity. The associated data of the new entry will also be provided by the CPS 130 and will include at least an output port (external and/or internal) in the subsystem 110, queuing and priority information to be used by the output ports of the outbound subsystem, and any header replacement information required for routing. The activity or aged destination field of the new entry will also indicate that the entry is new, i.e., no match as of yet.

Once the CPS 130 has determined that a new entry should be created as in block 311, the CPS 130 sets a timer or counter to a first time in block 317. The timer corresponds to the new entry and is normally a software timer within the CPS 130. The CPS 130 will include provisions such as pointers for the timer that identify its corresponding new entry as the one in forwarding memory 113 of subsystem 110.

When the timer runs out in block 321, the CPS 130 is notified in block 323, normally by an interrupt to CPU 135 or, alternatively, by polling. Based on its pointer provisions, the CPS 130 identifies the corresponding entry and determines whether the entry corresponding to the timer is still active by reading the value of its activity or aged destination field in the associated memory 114, as in decision block 325. If the activity field indicates that a received packet has not matched the entry since the timer was set to a first time, then the CPS 130 instructs the removal of the entry in block 327. If, however, the activity field indicated that the subsystem received a packet having headers that match the entry during the first time interval, then a second timer corresponding to the same entry is set to a second time in block 335. Also, the activity field is cleared to indicate no matching packets as of yet.

The above procedure beginning with block 321 repeats thereafter for each subsequent time-out of the second timer. Although the first and second timers are defined as separate timers, an alternative embodiment casts the first and second timer as the same software timer having two different time intervals.

An important aspect of the invention lies in the second time being preferably longer than the first time, where preferred numbers include approximately one second for the first time and three seconds for the second time. Furthermore, the first and second times can be chosen based on network layer addresses, Layer 4 protocols, and Layer 4 port numbers.

Exceptions to the above removal of entries based on time-out periods include the situation of RSVP signaling, where a flow entry is managed explicitly by RSVP. In that case, RSVP signaling between the source and destination will determine when the flow entry should be removed from the forwarding memory 123.

Other exceptions are packets destined to UDP port 111 (Layer 4 information). It has been observed that such packets appear to contribute greatly to packet flow entries which result in only a single matching packet before the first time expires. The network element 101 will thus be preferably configured to not make a Layer 3 flow entry for such packets.

The use of dual time periods described above thus presents a simple yet effective technique for keeping the number of entries in a forwarding memory 113 to a minimum. The technique's simplicity in verifying the age status of an entry in response to a time-out of two different time periods expedites the entire forwarding process. However, additional timers and time periods can be used to further fine tune the invention's entry removal mechanism, which may be viewed as dynamically changing the second time upon each time-out of the second timer.

The rationale behind the shorter first and longer second intervals can perhaps be explained by analyzing the probability of packets arriving at the network element 101 which match a given entry. An assumption is made that the intervals between the arrival of such packets are independent of each other. For a given stream of arriving packets, the probability of an interpacket gap exceeding a first time $t_1$ is $P_1$, and the probability of an interpacket gap exceeding a second time $t_2$ is $P_2$. Since the assumption is that $t_1 < t_2$, then $P_2 < P_1$ must be true in most circumstances.

If the sole basis for removing entries from the forwarding memory is to use $t_1$ as a time-out period, such that if an interpacket gap exceeds $t_1$ then the flow entry is removed, then the probability of not prematurely removing a flow for the first n packets is $(1-P_1)^n = (1-P_1)(1-P_1)^{n-1}$.

If, however, two timeout intervals are used, $t_1$ for the first interval, and $t_2$ for subsequent intervals between arriving packets, then the probability of not prematurely removing the entry for the first n packets is $(1-P_1)(1-P_2)^{n-1}$. Since $P_2 < P_1 < 1$, so is $(1-P_1)^{n-1} < (1-P_2)^{n-1}$, and thus the use of two interval times increases the probability of not prematurely removing a multi-packet flow, yet still effectively remove entries which only receive a single matching packet.

To summarize, the invention presents a technique in a network element for managing the entries in the forwarding memory. After identifying a first received packet as a member of a flow, an entry is created in the forwarding memory which identifies the flow. Thereafter, the entry is removed if a subsequent packet having a matching header is not received before a first time has elapsed. If, however, the subsequent packet having a matching header is received before the first time has elapsed, then the flow entry is kept and a timer is reset to a second longer time, such that the flow entry will be kept for subsequent packets arriving within the longer second time. Such a technique takes advantage of the pattern that if two packets arrive within the shorter first time, then the likelihood of more matching packets arriving within a subsequent longer time has substantially increased.

In another embodiment, yet more efficient use of a forwarding memory is made by implementing a longest-match approach, where the forwarding contains wildcarded entries. The wildcarding scheme allows for default routes to be defined based on any level of granularity desired for source and destination addresses, subnets, as well as transport layer ports.

The embodiments of the invention described above for exemplary purposes are, of course, subject to other variations in structure and implementation within the capabilities of one reasonably skilled in the art. For example, although many operations have been described as occurring sequentially, some of these can be implemented concurrently or even in a different order so long as the dependencies between them permit such deviation. Also, the invention can be implemented in a network element having a centralized forwarding memory rather than one having the distributed architecture of FIG. 1. Thus, the details above should be interpreted as illustrative and not in a limiting sense.

What is claimed is:

1. In a network element having a forwarding memory for storing a plurality of entries used for forwarding received packets, a method of managing the storage of the entries comprising the steps of:

making a first entry in the forwarding memory based upon a header of a first received packet; and one of marking the first entry for removal if a second packet having a header matching the first entry is not received before a first time has elapsed, and waiting a second time not equal to the first time before marking the first entry for removal if the second packet having the header matching the first entry is received before the first time has elapsed.

2. The method as in claim 1 wherein the second time is longer than the first time.

3. The method as in claim 2 where the first time is approximately one second and the second time is approximately three seconds.

4. The method as in claim 1 further comprising the step of marking the first entry for removal if a third packet having a third header matching the first entry is not received before the second time has elapsed.

5. The method as in claim 1 further comprising the step of waiting a third time before marking the first entry for removal if a third packet having a third header matching the first entry is received before the second time has elapsed.

6. The method as in claim 1 prior to the step of making the first entry, further comprising the step of searching the forwarding memory for a match between the header of the first received packet and an entry in the forwarding memory, and wherein the step of making the first entry is performed in response to not finding the match.

7. The method as in claim 5 wherein the third time is different than the second time.

8. The method as in claim 6 further comprising the step of selecting a most specific one of a number of matching entries.

9. The method as in claim 1 further comprising the step of ordering the plurality of entries in the forwarding memory from most specific to least specific, the most specific having the fewest wildcard characters of any of the plurality of entries.

10. The method as in claim 1 wherein the header further comprises a Layer 4 address.

11. The method as in claim 10 wherein the header further comprises a Layer 4 address.

12. The method as in claim 1 wherein at least one of the first time and the second time is selected based on predefined network layer addresses.

13. In a network element having an address table for storing a plurality of entries used for forwarding received packets, and a timer associated with each entry, a method of managing the entries in the address table comprising the steps of:

receiving a first packet;

making a first entry in the address table based upon a header of the first packet;

setting a first timer to a first time; and setting a second timer to a second time not equal to the first time if a second packet matching the first entry is received before the first time has elapsed.

14. The method as in claim 13 wherein the second time is longer than the first time.

15. The method as in claim 14 wherein the first time is approximately one second and the second time is approximately three seconds.

16. The method as in claim 13 further comprising the step of deleting the first entry if the second packet matching the first entry is not received before the first time has elapsed.

17. The method as in claim 13 wherein the first timer is the second timer.

18. The method as in claim 13 wherein the first entry comprises an activity field for indicating that the first entry has matched a received second packet.

19. The method as in claim 13 prior to setting the second timer further comprising the steps of:

searching the address table to find a matching entry in response to receiving the second packet, the first entry being a most specific one of a plurality of matching entries.

20. The method as in claim 13 further comprising the steps of:

ordering the plurality of entries in the forwarding memory from most specific to least specific, the most specific having the fewest wildcard characters of any of the plurality of entries; and searching the address table to find a matching entry.

21. The method as in claim 20 wherein the step of searching the address table to find the matching entry includes searching based on Layer 3 and Layer 4 headers of a received packet.

22. A network element for managing a plurality of entries in a forwarding memory, comprising:

means for initiating a search of the forwarding memory for an entry matching a portion of a first header of a received first packet;

means for making a first entry in the forwarding memory in response to finding no entry matching the portion of the first header of the received first packet, the first entry having an activity field indicating whether the first entry has matched a received second packet;

means for setting a first timer to a first time;

means for checking the activity field in response to the first timer running out; and means for setting a second timer to a second time not equal to the first time in response to the activity field indicating that the first entry has matched the received second packet.

23. The network element as in claim 22 wherein the second time is longer than the first time.

24. The network element as in claim 23 wherein the first time is approximately one second and the second time is approximately three seconds.

25. The network element as in claim 22 further comprising means for invalidating the first entry in response to the activity field indicating that the first entry has not matched the received second packet.

26. The network element as in claim 22 further comprising means for setting a third timer to a third time in response to the activity field indicating that the first entry has matched a received third packet before expiration of the second time.

27. The network element as in claim 22 wherein the first header is a Layer 3 header.

28. The network element as in claim 26 wherein the third time is approximately equal to the second time.

29. The network element as in claim 22 wherein the first entry comprises Layer 4 information.

30. The network element as in claim 22 wherein the second timer is the first timer.

31. The network element as in claim 22 further comprising memory configured for storing the forwarding memory and the plurality of entries; and means for ordering the plurality of entries in the memory from most specific to least specific.

32. The network element as in claim 31 wherein the memory is a content addressable memory.

33. The network element as in claim 22 wherein at least one of the means for making the first entry, means for setting the first timer, means for checking the activity field, and means for setting the second timer is a programmed processor.

34. The network element as in claim 22 wherein the first timer is a software timer.

35. The network element as in claim 22 wherein the means for initiating the search is a header matching logic circuit.

36. The network element as in claim 22 further comprising means for updating the activity field in response to the first entry matching the received second packet prior to the first timer running out.

* * * * *